A. H. DAVIS.
ADJUSTABLE SCHEDULE.
APPLICATION FILED APR. 11, 1921.

1,434,774.

Patented Nov. 7, 1922.

Albert H. Davis
INVENTOR.

BY Hazard & Miller
ATTORNEYS.

Patented Nov. 7, 1922.

1,434,774

UNITED STATES PATENT OFFICE.

ALBERT H. DAVIS, OF LA HABRA, CALIFORNIA.

ADJUSTABLE SCHEDULE.

Application filed April 11, 1921. Serial No. 460,167.

*To all whom it may concern:*

Be it known that I, ALBERT H. DAVIS, a citizen of the United States, residing at La Habra, in the county of Orange and State of California, have invented new and useful Improvements in Adjustable Schedules, of which the following is a specification.

This invention relates to schedules employed in connection with the fumigating of citrus trees and the like, and has for its object the provision of a schedule which will not only show at a glance the normal dosage for fumigating trees of various size, but which is also readily adjustable so as to correct such normal dosage for denoting the proper dosage under various circumstances and conditions, such as at different times of the year, various temperatures, etc.

It is a still further object of the invention to provide such a schedule which will readily show the length of time for which any specified dosage denoted by the schedule should be applied. The improved schedule also provides means for showing what percentage of a normal dosage is being applied by the corrected dosage obtained after taking into consideration the various climatic and other conditions.

The improved schedule further provides means for ascertaining what dosage to apply when it is desired to treat trees with a specified percentage of a normal dosage, and in conjunction with such means the schedule will show at what seasons of the year it is safe to apply the various percentages of a normal dosage.

In the present form of the invention, the adjustable schedule is shown as employed for orange trees and for lemon trees, but it will be readily understood that similar schedules may be employed for any desired number of different trees requiring different schedules, and that such various schedules may be assembled in a single chart mechanism as is found desirable.

It will also be noted, in the chart mechanism which I have shown as exemplifying my invention, that the adjustable dosage sheet of the chart is shown as a flat sheet slidable between cover sheets having side openings, but it is to be understood that my invention is in no way limited to such a mechanical embodiment of the invention, said invention in its broadest sense contemplating the provision of a schedule embodied in any practical mechanical means and arranged for adjustment of said schedule so as to give correct readings for various changed conditions.

The invention will be readily understood from the following description of the accompanying drawings, in which—

Figure 1:
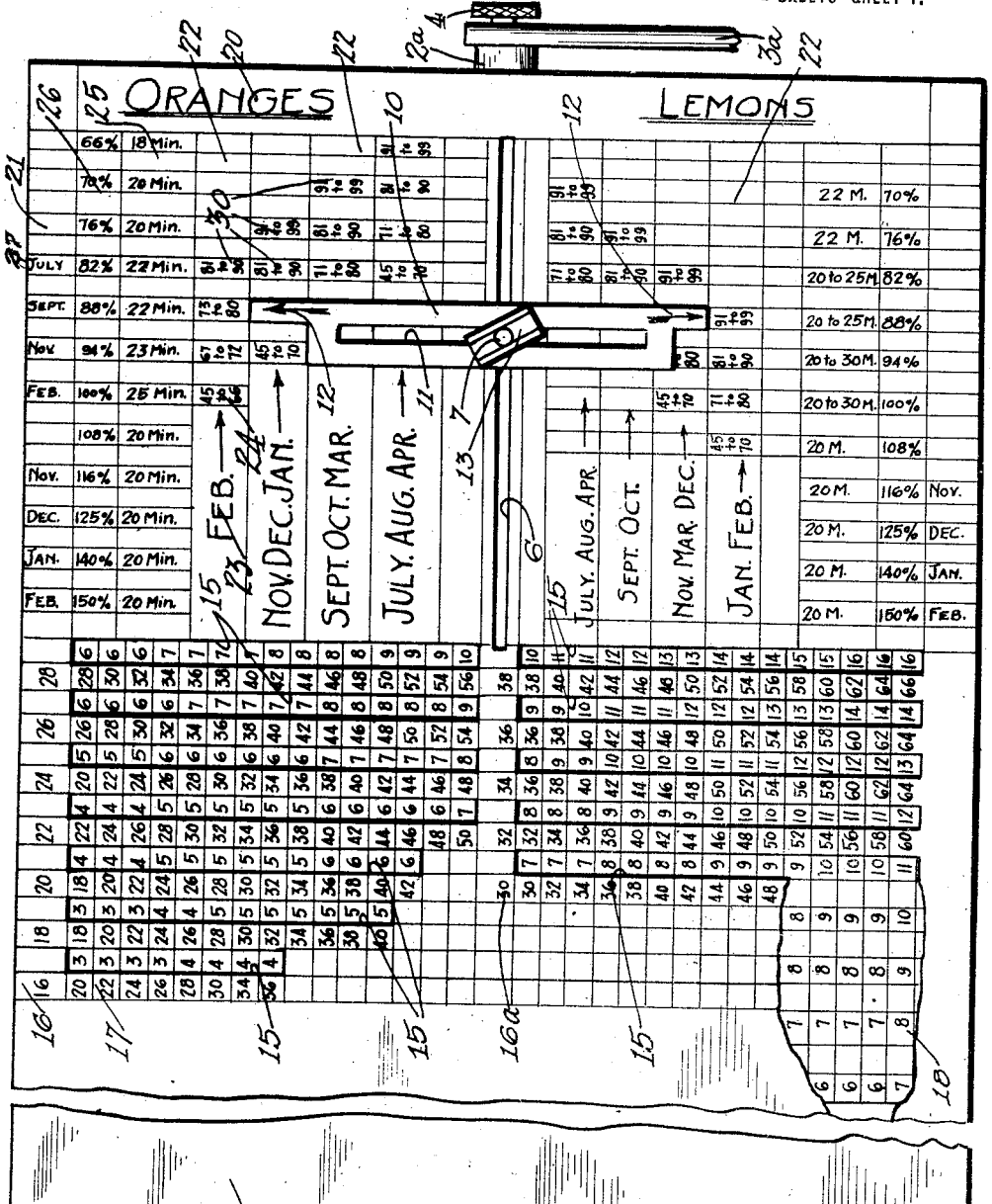
Figure 1 is a front elevation showing a practical embodiment of the invention and partly broken away.
Figure 2:
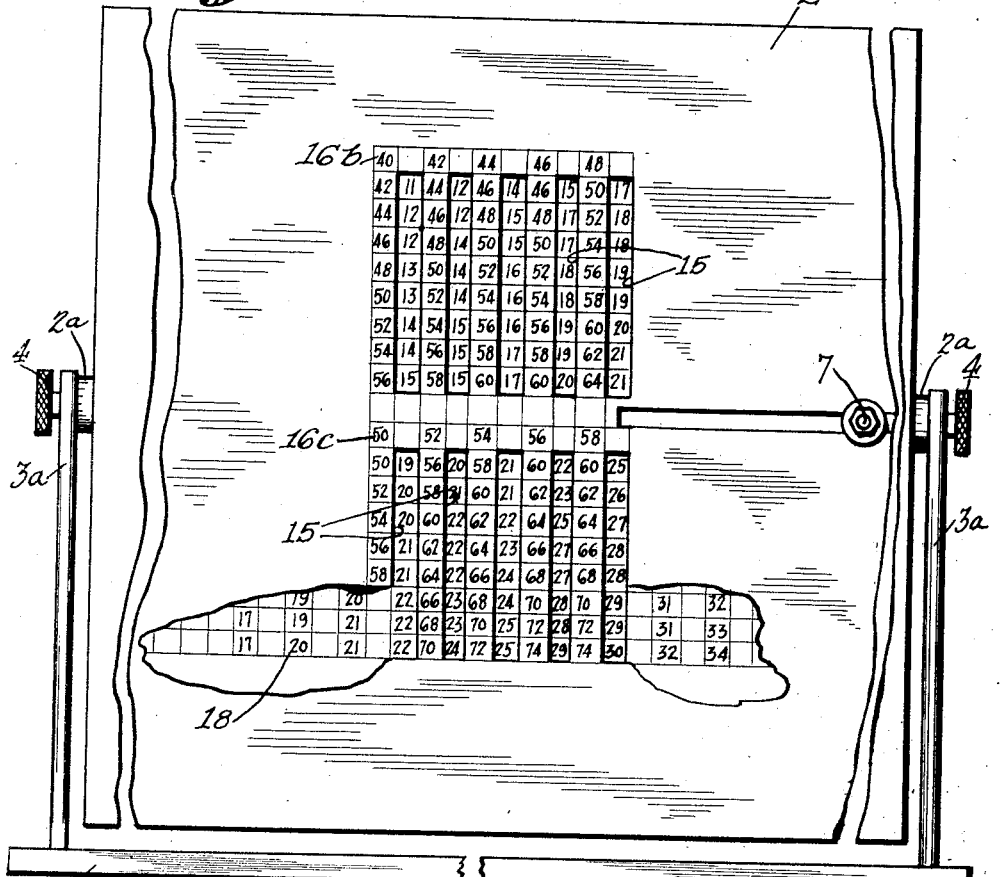
Fig. 2 is a similar view showing the schedule chart reversed in its mounting so as to expose the opposite side of the same with the schedule chart partly broken away.
Figure 3:
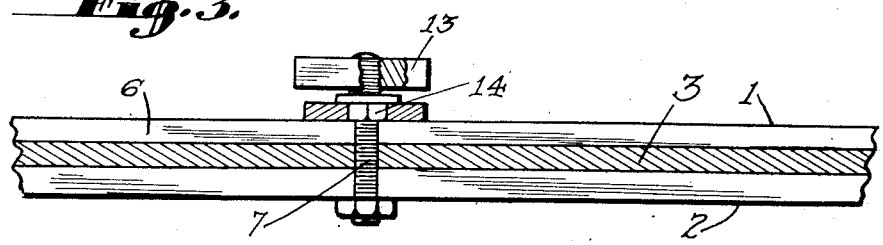
Figure 3 is a detail section transversely of Fig. 1.

As previously stated the present embodiment of the invention comprises a flat chart including a frame having spaced cover plates 1 and 2 provided with suitable side openings and adapted to receive a dosage sheet 3 between the same with marks upon the respective surfaces of the dosage sheet so that the schedule may be read through the sight openings at either side of the same.

The chart, as thus constructed, is mounted in a suitable frame as to be readily reversed to permit of reading of said chart through the sight openings upon either surface thereof, and for this purpose the chart is shown as provided with pintles $2^a$ rotatable in bearings of supporting arms $3^a$ and provided with clamping nuts 4 for securing the chart in position with either surface thereof turned toward the user. The arms $3^a$ may be carried by any suitable base 5 so as to form a suitable support for the chart.

Slots 6 are provided in cover plates 1 and 2, and a bolt 7 is connected to the dosage sheet so as to extend through said slots at its respective ends and thereby guide the movement of the dosage sheet with relation to the cover plates. The slots 6 are so arranged that the dosage sheet may be shifted transversely of cover plates 1 and 2, and an indicator arm 10 is received upon bolt 7 above cover plate 1 as by providing said indicator with an elongated slot 11 so that it may be readily shifted longitudinally with relation to the bolt.

The ends of indicator 10 are preferably provided with indicating marks 12, and the shifting of the indicator with relation to bolt 7 is thus adapted to move one or the other of the indicating marks 12 into position with relation to transverse graduations upon the cover plate 1 in both directions beyond slot 6. The indicator 10 may be clamped in adjusted positions with relation to bolt 7, and the bolt and the dosage sheet may, at the same time, be clamped in adjusted positions along the lengths of slots 6 as by means of a suitable clamping nut 13 received upon the end of the bolt. The portion of the bolt upon which the indicator 10 slides is preferably non-circular in cross section as shown at 14 so as to fix the indicator 10 against rotation upon said bolt and position the same at right angles to slots 6.

The sight openings arranged in cover plates 1 and 2 are shown as elongated slots 15, and in practice two series of transversely spaced slots are preferably provided one beyond another in each of the cover plates. The spaces upon the cover plates to one side of the slots and the spaces beyond the ends of the slots are for graduated markings. As an instance of this arrangement, respective slots are marked in the spaces beyond ends of the same to denote various distances in feet around trees.

By reference to Fig. 1 it will be seen that one of the series of slots in cover plate 1 is thus marked to denote distances around trees from 16 feet to 28 feet, as shown at 16, and that the second series of slots in cover plate 1 denotes distances from 30 feet to 38 feet, as shown at 16ª. In similar manner, it will be noted that the respective series of slots in cover plate 2 denote a distance from 40 to 48 feet, and from 50 to 58 feet respectively, as shown at 16ᵇ and 16ᶜ.

The graduations in the spaces along the lengths of slots 15 are arranged to denote various distances over trees in feet for trees of the different distances around the same. Thus it will be seen that the slot for trees of 16 feet around the same is graduated from 20 to 36 feet over the same, as shown at 17, and that the various other slots are similarly graduated.

The dosage sheet shiftable transversely of the chart and of slots 15, as previously described, is provided with longitudinal rows of figures 18 transversely spaced, so that when the dosage sheet is in one position, figures of the various rows will appear through the slots in cover plates 1 and 2 with the spaces between said rows covered by the strips dividing slots 15, and when the dosage sheet is transversely shifted, the relation of the rows of figures 18 to the slots 15 will be correspondingly shifted.

The index means for the adjustment of the shifting of the dosage sheet includes charts upon cover plate 1 beyond slots 6 in both directions and thereby underlie the respective ends of indicator 10. In the present instance one of these charts is for oranges and the other chart is for lemons, and said charts are provided with distinguishing indicating marks 20.

Each chart includes a plurality of longitudinal columns 21 adapted to have indicator 10, and thereby the bolt 7 and the dosage sheet, shifted transversely into position corresponding with the various longitudinal columns. It will be understood that these columns are so positioned that when indicator 10 is shifted transversely from one to the next, the rows of figures 18 upon the dosage sheet will be similarly shifted so as to appear through the next adjacent slots 15.

The chart beneath the end of indicator 10 is also provided with transverse columns 22, and the indicator may be shifted longitudinally with relation to bolt 7 so as to position the indicating marker 12 with relation to any one of the transverse columns 22.

The transverse columns 22 are for different seasons of the year and may be indicated, as shown at 23, by the names of the months included in these respective seasons. It will be noted that in treating orange and lemon trees, the seasons of the year for such treatment differ, and as a consequence the markings 23 for the orange chart will differ in corresponding manner to the markings 23 for the lemon chart.

Each of the transverse columns 22 is marked in certain ones of the longitudinal columns 21 with various temperatures as shown at 30. Thus, for example, one longitudinal column may be marked for a temperature from 45° to 66°, the next longitudinal column may be marked for temperatures from 67° to 72° and so forth. It will be understood that the markings 24 in the various transverse columns 22 are in different ones of the longitudinal columns 21, in order that shifting of the dosage sheet, by moving the indicator into positions cooperating with the various markings 24, will cause various shiftings of said dosage sheet to cause proper rows of figures of the dosage sheet to appear through slots 15.

The various longitudinal columns 21 are provided with markings 25 in order to denote different lengths of time. These markings are so graduated that, with indicator mark 12 set to correspond with a certain one of the markings 24 in order to denote the proper dosage for a certain season of the year and at a certain temperature, the corresponding mark 25 denoted by the indicator 12 will show the proper length of time for applying the dosage.

The columns 21 are also graduated in percentages by the markings 26 in order that indicator 12 will show the percentage of a normal dosage which is being applied when the schedule has been adjusted to correct the normal dosage for the various climatic changes. The percentage graduations may extend beyond the columns 21 having the markings 24 therein so as to denote percentages greater than 100% and by this arrangement is will be noted that when it is desired to apply a dosage of a certain percentage, say 125%, that the chart will show, by means of markings 25, for what length of time said dosage should be applied, and by shifting indicator 10 into alinement with the longitudinal column having the 125% mark therein, the shedule will also show the proper dosage of this percentage to be applied to a tree of any given size.

Certain of the columns 21 are preferably also indicated by markings 27 denoting the various months of the year so as to show at which seasons of the year it is safe to apply the specified percentage of a normal dosage.

It will be understood that the rows of figures upon the dosage sheet are so arranged that when the dosage sheet is shifted to a position bringing the indicator 10 into alinement with the longitudinal column of the orange and lemon charts having 100% marked in the transverse columns 26, that the numbers displayed through slots 15 will denote dosages in accordance with the usual normal dosage schedules, and that when the indicator is shifted one way or the other, as previously described, that the shifting of the dosage sheet will cause numbers to be displayed denoting the required changes in dosage in accordance with the changes in the percentage of the normal dosage which is figured out to correspond with the changes in climatic conditions.

It will be noted that the construction, as thus described, provides an adjustable schedule which is varied in accordance with climatic and other conditions, and that the device may be readily adjusted by the operator, and the chart then swung upon its pivots to display either side of the same, and in order that the dosage, for any size of tree, may be read.

Various changes may be made without departing from the spirit of the invention as claimed.

What is claimed is:

1. A dosage indicating device including a chart having parallel sight slots which are indexed in accordance with the sizes of objects to be fumigated, the chart having also rows of governing factors including season, temperature and time characters, and a dosage sheet having rows of indicating digits to be adjusted as to the said slots as determined by the governing factors at ascertained conditions of fumigation.

2. A dosage indicating device including a chart having parallel sight slots which are indexed in accordance with the sizes of objects to be fumigated, the chart having also rows of governing factors including season, temperature and time characters, a dosage sheet having rows of indicating digits to be adjusted as to the said slots as determined by the governing factors at ascertained conditions of fumigation, and means for relatively shifting the chart and the sheet to secure the proper disposition of the digits for ascertained conditions.

3. A dosage indicating device including a chart having parallel sight slots which are indexed in accordance with the sizes of objects to be fumigated, the chart having also rows of governing factors including season, temperature and time characters, a dosage sheet having rows of indicating digits to be adjusted as to the said slots as determined by the governing factors at ascertained conditions of fumigation, and an indicator adjustably mounted upon the device so as to be positioned at selected factors on the chart.

4. A dosage indicating device including a chart having parallel sight slots which are indexed in accordance with the sizes of objects to be fumigated, the chart having also rows of governing factors including season, temperature and time characters, a dosage sheet having rows of indicating digits to be adjusted as to the said slots as determined by the governing factors at ascertained conditions of fumigation, means for relatively shifting the chart and the sheet to secure the proper disposition of the digits for ascertained conditions, and an indicator adjustably mounted upon the device so as to be positioned at selected factors on the chart, said indicator being attached to the shifting means so as to move with the said sheet.

5. A dosage indicating device including a chart having parallel sight slots which are indexed in accordance with the sizes of objects to be fumigated, the chart having also rows of governing factors including season, temperature and time characters, a dosage sheet having rows of indicating digits to be adjusted as to the said slots as determined by the governing factors at ascertained conditions of fumigation, an indicator adjustably mounted upon the device so as to be positioned at selective factors on the chart, the chart having a guide slot, and a stem therein connected to said sheet and on which stem the indicator is slidably, but not rotatively, mounted.

6. A dosage indicating device including a chart having parallel sight slots which are indexed in accordance with the sizes of objects to be fumigated, the chart having also rows of governing factors including season, temperature and time characters, a dosage sheet having rows of indicating digits to be adjusted as to the said slots as determined by the governing factors at ascertained conditions of fumigation, an indicator adjustably mounted upon the device so as to be positioned at selected factors on the chart, the chart having a guide slot, and a stem therein connected to said sheet and on which stem the indicator is slidably, but not rotatively, mounted, the guide slot being at a right angles to the said sight slots.

7. A dosage indicating device including a chart having parallel sight slots which are indexed in accordance with the sizes of objects to be fumigated, the chart having also rows of governing factors including season, temperature and time characters, a dosage sheet having rows of indicating digits to be adjusted as to the said slots as determined by the governing factors at ascertained conditions of fumigation, and an indicator adjustably mounted upon the device so as to be positioned at selected factors on the chart, the governing factors being arranged in different systems for different kinds of objects to be treated, and said indicator being adjustable to indicating positions on each system.

8. A dosage indicating device including a chart having parallel sight slots which are indexed in accordance with the sizes of objects to be fumigated, the chart having also rows of governing factors including season, temperature, percentage and time characters, and a dosage sheet having rows of indicating digits to be adjusted as to the said slots as determined by the governing factors at ascertained conditions of fumigation.

In testimony whereof I have signed my name this specification.

ALBERT H. DAVIS.